US006924318B2

(12) United States Patent
Mischi et al.

(10) Patent No.: US 6,924,318 B2
(45) Date of Patent: Aug. 2, 2005

(54) METHOD FOR MAKING A BIPOLAR MEMBRANE AND USE OF RESULTING BIPOLAR MEMBRANE

(75) Inventors: Ellenio Mischi, Rosignano Solvay (IT); Davide Mantione, Bahia Blanca (P.cia Buenos Aires) (AR); Alessandra Pastacaldi, Rosignano Solvay (IT); Luc Botte, Rosignano Solvay (IT)

(73) Assignee: SOLVAY (Societe Anonyme), Brussels (BE)

( * ) Notice: Subject to any disclaimer, the term of this patent is extended or adjusted under 35 U.S.C. 154(b) by 226 days.

(21) Appl. No.: 10/257,399

(22) PCT Filed: Apr. 13, 2001

(86) PCT No.: PCT/EP01/04334

§ 371 (c)(1),
(2), (4) Date: Apr. 21, 2003

(87) PCT Pub. No.: WO01/79335

PCT Pub. Date: Oct. 25, 2001

(65) Prior Publication Data

US 2003/0155244 A1 Aug. 21, 2003

(30) Foreign Application Priority Data

Apr. 19, 2000 (FR) .......................................... 00/05133

(51) Int. Cl.$^7$ ............................................. C25B 13/00
(52) U.S. Cl. ............................. 521/27; 521/28; 521/33; 204/296
(58) Field of Search ............................... 521/27, 28, 33; 204/296

(56) References Cited

U.S. PATENT DOCUMENTS

| 5,227,040 A | * | 7/1993 | Simons ....................... 204/631 |
| 5,401,408 A | * | 3/1995 | Umemura et al. .......... 204/631 |
| 6,217,733 B1 | * | 4/2001 | Hurwitz et al. ............. 204/631 |

FOREIGN PATENT DOCUMENTS

| EP | 0 459 820 | 12/1991 |
| EP | 0 659 467 | 6/1995 |
| GB | 2 122 543 | 1/1984 |
| WO | 89 01059 | 2/1989 |
| WO | 96 01286 | 1/1996 |
| WO | 96 09337 | 3/1996 |

* cited by examiner

Primary Examiner—Arun S. Phasge
(74) Attorney, Agent, or Firm—Oblon, Spivak, McClelland, Maier & Neustadt, P.C.

(57) ABSTRACT

A process for producing a bipolar membrane is described in which a cationic membrane undergoes a treatment with a salt from a group 8 metal, an anionic membrane undergoes a treatment with a salt of a transition metal not belonging to group 8, and then the two membranes are conjoined and, before and/or after having been conjoined, the membranes are brought into contact with a treatment solution selected from alkaline aqueous solutions, aqueous metal sulphate solutions and aqueous metal sulphite solutions.

8 Claims, No Drawings

METHOD FOR MAKING A BIPOLAR MEMBRANE AND USE OF RESULTING BIPOLAR MEMBRANE

The present invention relates to a process for producing bipolar membranes.

Bipolar membranes are constituent elements of electrodialysis cells. These latter are well known in the art where they are used, in particular, to produce acids and bases from aqueous solutions of their salts. In that application, the bipolar membranes are immersed in aqueous electrolytes, where they are the seat of water dissociation under the action of an electrical field. An effort is generally made to reduce the voltage needed to dissociate water in the bipolar membrane.

In processes generally used to produce bipolar membranes, a cationic membrane and an anionic membrane that have previously undergone a conditioning pretreatment are conjoined. To this end, European patent EP-B-0 368 924 (UNISEARCH LIMITED) describes a process for producing a bipolar membrane in which a cationic membrane and an anionic membrane undergo identical conditioning pre-treatments, which comprises bringing them into contact with an aqueous solution of a salt of a metal other than sodium or potassium and with an alkaline solution (generally an aqueous sodium hydroxide solution); the membranes recovered from the conditioning pre-treatment are then superimposed to constitute the bipolar membrane.

The process described in European patent EP-B-0 769 032 differs from the process described in European patent EP-B-0 368 924 in that the alkaline solution is replaced by an aqueous metal sulphate or sulphite solution, so as to form a gel of hydrated metal sulphate or sulphite at the interface of the two conjoined membranes. Further, in the process described in EP-B-0 769 032, treatment of the cationic and anionic membranes with the metal sulphate or sulphite solution can invariably be carried out before or after superimposing said membranes.

The bipolar membranes obtained using the known processes just described exhibit good mechanical cohesion, moderate electrical resistance and require a moderate voltage to dissociate water.

The object of the invention is to provide bipolar membranes with improved performances relative to those of membranes obtained by dint of the known processes described above, in particular bipolar membranes affording a lower water dissociation tension.

As a result, the invention concerns a process for producing a bipolar membrane, in which a cationic membrane and an anionic membrane undergo a treatment with a metal salt, the two membranes are conjoined and, before and/or after conjoining the two membranes, they are brought into contact with a treatment solution selected from alkaline aqueous solutions, aqueous metal sulphate solutions and aqueous metal sulphite solutions, the process being characterized in that a salt of a metal from group 8 of the periodic table of the elements is selected to treat the cationic membrane, and a salt of a transition metal that does not belong to group 8 is selected to treat the anionic membrane.

In the process of the invention, the cationic membrane is a thin, non-porous sheet, which is selectively permeable to cations and impermeable to anions. Cationic membranes that can be used in the process of the invention must be produced from a material that is inert towards acidic or basic aqueous solutions. Examples of cationic membranes that can be used in the process of the invention are fluorinated polymer sheets containing functional groups derived from sulphonic acids, carboxylic acids or phosphonic acids or mixtures of said functional groups, said groups acting as cationic sites fixed to the membrane. Examples of cationic membranes of that type are those known under the trade name RAIPORE (PALL RAI) and under the trade name MORGANE (SOLVAY), in particular the membranes PAIPORE R-4010, MORGANE CDS and MORGANE CPA.

The anionic membrane is a thin, non-porous sheet that is selectively permeable to anions and impermeable to cations. Anionic membranes that can be used in the process of the invention are sheets formed from a polymeric material that is inert towards aqueous acidic or basic solutions and comprises quaternary ammonium groups acting as fixed anionic sites. The membranes RAIPORE R-1030, RAIPORE R-4030 and MORGANE ADP constitute examples of anionic membranes that can be used in the process of the invention.

Bipolar membranes are membranes that have on one face the properties of a cationic membrane and on the other face the properties of an anionic membrane.

The thickness of the anionic and cationic membranes will govern the mechanical and electrochemical properties of the bipolar membrane obtained at the end of the process of the invention. The optimum thickness of the anionic and cationic membranes will result from a compromise between a sufficient mechanical strength (property favoured by greater thicknesses) and a low transverse electrical resistance (property favoured by smaller thicknesses). In practice, the cationic membrane and the anionic membrane are each generally more than 10 $\mu$m thick, preferably at least 10 $\mu$m thick. They are generally less than 150 $\mu$m and rarely exceed 100 $\mu$m, with the most suitable thicknesses generally being 30 to 150 $\mu$m.

In the process of the invention, the cationic membrane and the anionic membrane are treated separately with a metal salt. In accordance with the invention, a salt of a group 8 metal is selected for treating the cationic membrane and a salt of a transition metal that does not belong to group 8 is selected for treating the anionic membrane. The metal salt is advantageously a water-soluble salt, preferably an inorganic salt, hydrated inorganic salts being especially recommended. Chlorides, nitrates, sulphates and phosphates are suitable.

Treating the cationic membrane and the anionic membrane with metal salts has the function of substituting at least a portion of the co-ions of the membranes with ions of the metals in the metal salts. In general, efforts are made to incorporate into each of the two membranes a quantity of metal salt ions which is more than 10 and less than 100 mg per $m^2$ of membrane surface area. The surface area to be considered is that of the face of the membrane (cationic or anionic) which comes into contact with the other membrane (anionic or cationic) in the bipolar membrane. Values of 10 to 100 mg/$m^2$ are preferred; values of 25 to 40 mg/$M^2$ are especially advantageous.

A convenient means for treating the cationic and anionic membranes with metal salts consists of impregnating said face of these membranes with an aqueous solution of a metal salt. The membranes can readily be impregnated by immersing them in a bath of a solution of the metal salt. Any other known and suitable means for impregnation can clearly be used. The aqueous solution of the metal salt can equally be an acidic solution, a basic solution or a solution with a neutral pH. In practice, the optimum pH is governed by the metal salt used so as to obtain the maximum solubility. Although the concentration of the aqueous solution is not critical, concentrated solutions are preferred. It is recommended that aqueous solutions be used in which the concentration of metal salt is at least 0.1 (preferably 0.5) mol/l. The maximum permissible concentration of the aqueous metal salt solution is that which corresponds to saturation, and it consequently depends on various parameters, such as the metal salt employed, the temperature of the solution and the pH thereof. Preferably, solutions which are at a temperature that is close to ambient temperature, for example 15° C. to 35° C., are employed.

In the process of the invention, in addition, the cationic and anionic membranes are brought into contact with a treatment solution selected from aqueous alkaline solutions, aqueous metal sulphate solutions and aqueous metal sulphite solutions. Preferred examples of alkaline solutions are solutions of alkali metal hydroxides, including sodium hydroxide and lithium hydroxide, which are preferred. The metal sulphates and sulphites are advantageously selected from alkali metal sulphates and sulphites. Aqueous sodium sulphate solutions and aqueous sodium sulphite solutions constitute preferred treatment solutions.

A convenient means for bringing the cationic and anionic membranes into contact with the treatment solution consists of immersing them in a bath of said treatment solution as discussed above in the case of treatment with the metal salt. Any other known and suitable impregnation means can also be used.

Any suitable means can be employed for conjoining the cationic membrane to the anionic membrane. A preferred means consists of applying the two membranes one to the other in the moist state, avoiding the formation of air pockets between them. The two membranes can be applied to each other under pressure or without employing pressure. The two membranes can be conjoined at ambient temperature or at a higher temperature, provided that the temperature is below the thermal degradation temperature of the cationic membrane or of the anionic membrane.

In the process of the invention, bringing the cationic and anionic membranes into contact with the treatment solution can be carried out before or after conjoining said two membranes to form the bipolar membrane. Preferably, it is carried out before conjoining the two membranes.

In an advantageous implementation of the process of the invention, the group 8 metal is selected from iron, cobalt and nickel and the transition metal not belonging to group 8 is selected from chromium, molybdenum and tungsten.

In a further implementation of the process of the invention, the group 8 metal salt is dispersed in a fraction of the treatment solution and the transition metal salt is dispersed in another fraction of the treatment solution and, prior to conjoining the two membranes, the cationic membrane is treated with the fraction of treatment solution containing the group 8 metal salt and the anionic membrane is treated with the other fraction of the treatment solution. This implementation of the process of the invention has the advantage of simplifying the operating procedure.

In a preferred variation of the implementation just described, the treatment solution is an aqueous solution of an alkali metal (preferably sodium) sulphate or sulphite and the cationic and anionic membranes are matured in contact with the treatment solution before being conjoined to constitute the bipolar membrane. In this variation of the invention, maturing acts to cause precipitation of the group 8 metal sulphate or sulphite in the cationic membrane and precipitation of the transition metal sulphate or sulphite in the anionic membrane with the subsequent formation of a gel. Supplemental information regarding the maturing treatment can be obtained from European patent EP-B-0 769 032 [SOLVAY (Société Anonyme)].

The bipolar membrane recovered at the end of the process of the invention must preferably be stored in the moist state before using it in an electrodialysis cell.

The bipolar membrane obtained from the process of the invention is well suited to electrochemical decomposition of water and, as a result, it can be used in electrodialysis techniques employing aqueous solutions.

Consequently, the invention also concerns the use of the bipolar membrane obtained using the process of the invention for the production of an alkali metal hydroxide by electrodialysis of an aqueous solution of an alkali metal salt. In particular, it concerns the use of said bipolar membrane for the production of sodium hydroxide by electrodialysis of an aqueous solution of sodium chloride, carbonate, sulphate or nitrate.

Particular features and details of the invention will become apparent from the following description of an example of an implementation of the process of the invention.

A bipolar membrane was produced starting from a cationic MORGANE CDS membrane and an anionic MORGANE ADP membrane. To this end, firstly, a bath for treating the cationic membrane and a bath for treating the anionic membrane were prepared separately. The bath intended for the cationic membrane consisted of an aqueous solution of ferric nitrate nonahydrate, sodium sulphate and magnesium sulphate. The bath intended for the anionic membrane consisted of an aqueous solution of chromic nitrate nonahydrate, sodium sulphate and magnesium sulphate.

The cationic membrane was immersed in the bath containing the ferric nitrate and the anionic membrane was immersed in the bath containing the chromic nitrate. The two membranes were matured in their respective baths by keeping them immersed therein for a period of 50 to 80 hours, the baths being maintained at a temperature of 75° C. to 100° C.

After said maturing treatment, the two membranes were withdrawn from their baths, immediately applied one onto the other and a momentary pressure of about 15 bars was applied to the two conjoined membranes by passing them once between the rolls of a press.

What is claimed is:

1. Process for producing a bipolar membrane, in which a cationic membrane and an anionic membrane undergo a treatment with a metal salt, the two membranes are conjoined and, before and/or after conjoining the two membranes, they are brought into contact with a treatment solution selected from alkaline aqueous solutions, aqueous metal sulphate solutions and aqueous metal sulphite solutions, characterized in that a salt of a metal from group 8 of the periodic table of the elements is selected to treat the cationic membrane, and a salt of a transition metal that does not belong to group 8 is selected to treat the anionic membrane.

2. Process according to claim 1, wherein the group 8 metal is selected from iron, cobalt and nickel, and the transition metal that does not belong to group 8 is selected from chromium, molyhdenum and tungsten.

3. Process according to claim 1, wherein the salt of the metal from group 8 and the salt of the transition metal not belonging to group 8 are selected from nitrates and chlorides.

4. Process according to claim 1, wherein the salt of the group 8 metal is dispersed in a fraction of the treatment solution and the salt of the transition metal is dispersed in another fraction of the treatment solution and, prior to conjoining the two membranes, the cationic membrane is treated with the fraction of the treatment solution containing the salt of the group 8 metal and the anionic membrane is treated with the other fraction of the treatment solution.

5. Process according to claim 1, wherein the treatment solution is a solution of an alkali metal sulphate or sulphite.

6. Process according to claim 5, wherein the treatment solution is a sodium sulphate solution.

7. Process according to claim 5, wherein the cationic membrane and the anionic membrane undergo maturing in contact with the treatment solutions.

8. Process according to claim 1, wherein the metal salts are hydrated salts.

* * * * *